United States Patent
Kamiya (10) Patent No.: US 6,317,179 B1
(45) Date of Patent: Nov. 13, 2001

(54) REFLECTION TYPE DISPLAY AND COLORING METHOD THEREOF

(75) Inventor: Hiroyuki Kamiya, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/924,464

(22) Filed: Aug. 21, 1997

(30) Foreign Application Priority Data

Sep. 4, 1996 (JP) ................................................. 8-234387

(51) Int. Cl.[7] .......................... G02F 1/1347; G02F 1/1335
(52) U.S. Cl. ......................... 349/78; 349/105; 349/113; 349/114
(58) Field of Search ................................ 349/78, 86, 115, 349/114, 185, 105, 104, 106, 113; 359/586, 588

(56) References Cited

U.S. PATENT DOCUMENTS 3,972,590 * 8/1976 Gelber .................................. 349/106
5,200,845 * 4/1993 Crooker et al. ....................... 349/86
5,510,215 * 4/1996 Prince et al. ......................... 359/359
5,956,113 * 9/1999 Crawford ............................. 349/185

FOREIGN PATENT DOCUMENTS

| Pupa 07-13146 | 1/1995 | (JP) | .............................. G02F/1/1333 |
| Pupa 04-178623 | 6/1992 | (JP) | .............................. G02F/1/1335 |

* cited by examiner

Primary Examiner—William L. Sikes
Assistant Examiner—Tai V. Duong
(74) Attorney, Agent, or Firm—Jay P. Sbrollini

(57) ABSTRACT

A reflection liquid crystal display of the multilayered interference film type with both sufficient color purity and sufficient white level is provided using interference films having a large difference in refractive index, $\Delta n$, between two kinds of dielectric. In this reflection type liquid crystal display, at least two combinations of a transparent substrate, a multilayered film, and a light transmission layer, each for a different color, are stacked on a plane of the display. It is desirable that the difference between refractive indexes of the two different kinds of dielectric layers is $\Delta n > 1.2$.

7 Claims, 7 Drawing Sheets

[Document type] Drawing
[Figure 1]

REFLECTION TYPE DISPLAY AND COLORING METHOD THEREOF

FIELD OF THE INVENTION

The present invention relates to a color reflection type TFT liquid crystal display (TFT-LCD). More particularly, the invention relates to a coloring method using a multilayered dielectric film, and to the structure of the color TFT-LCD for that coloring method.

BACKGROUND ART

Liquid crystal color displays are used in various fields such as displays for computers. With such liquid crystal color displays, it is possible to obtain very highly accurate images.

Many of liquid crystal displays being currently used are transmission type TFT-LCDs. In such TFT-LCDs, light from a back light source is transmitted through liquid crystal cells from the rear of a substrate on which thin film transistors (TFTs) are formed. The polarization state of that light is varied by changing in the orientation of the liquid crystal using the TFTs as switches, and a polarizing plate is used to discriminate between cells which emit specific polarized light and cells which does not emit specific polarized light. However, brightness suffers in this transmission type liquid crystal display because light is filtered through the polarizing plate and color filters. Also, the weight and power dissipation of the back light is a disadvantage in small or portable computers.

Figure 1:
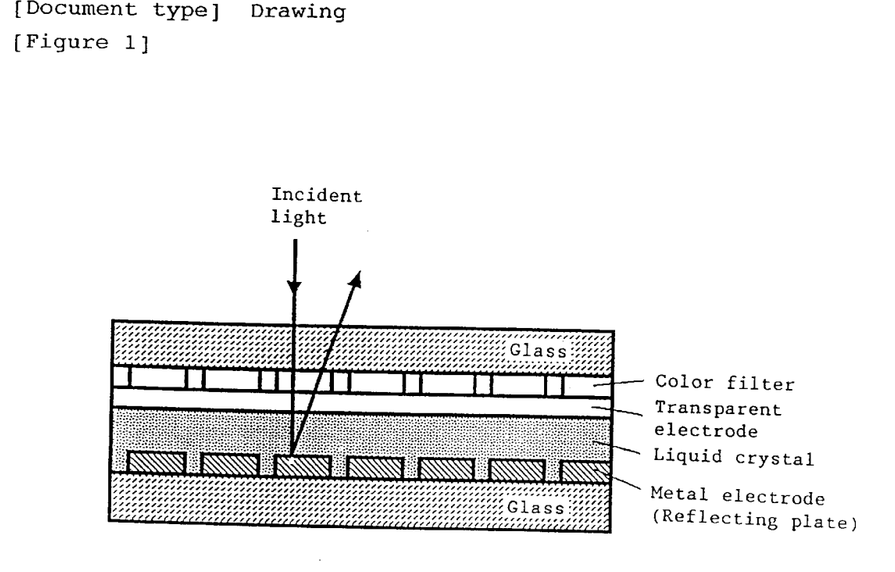
FIG. 1 is a schematic diagram of a reflection type liquid crystal display.

For the above reasons, reflection type liquid crystal displays, which have no back light and which ensure a sufficient light quantity using surrounding light appear to be attractive. A schematic diagram of a reflection type liquid crystal display is shown in FIG. 1. This reflection type liquid crystal display is similar to a conventional transmission type liquid crystal display in that it has a liquid crystal interposed between two transparent substrates (which are usually glass substrates). Similarly, a transparent electrode pattern is formed on one of the glass plates formed with a color filter. However, the reflection type liquid crystal display differs from the transmission type liquid crystal display in that the electrode formed on the other glass plate is not a transparent electrode but a metal electrode which serves as a reflecting plate. The light incident on the glass substrate on the color filter side is modulated by the liquid crystal oriented by the voltage applied between the transparent electrode and the metal electrode, and the modulated light is reflected at the surface of the metal electrode and emitted from the glass substrate on the color filter side.

A reflection type liquid crystal display such as this, however, has the disadvantage that sufficient brightness is unobtainable, because of the color filter it employs. About ⅔ of incident white light is absorbed by the color filter. The display does not have high transmittance because of the dyes and pigments are employed as a means of coloring a color filter formed by a normal dyeing method, pigment dispersing method or printing method.

Japanese Published Unexamined Patent Application (PUPA) No. 7-287115, proposes stacking a thin film consisting of a high refractive material and a thin film consisting of a low refractive material to form a multilayered interference film for emitting color without using a color filter. This structure substitutes for a color filter by allowing light of a specific wavelength region to pass through the alternately stacked multilayered film and, by reflecting light of a wavelength region other than that transmitted by the multilayered film. This provides a transmittance of near 100% in the transmitted wavelength region and has a reflectance of near 100% in the reflected wavelength region, with no reduction in the transmittance which is caused by color filters making use of absorption of pigments.

Figure 2:
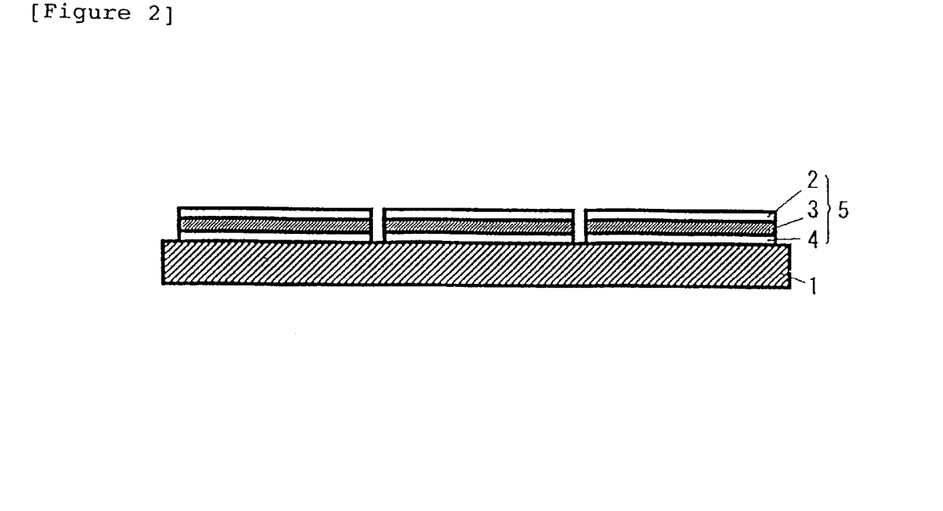
FIG. 2 is a schematic diagram of a conventional parallel multilayered interference film type (three layers)

An example of a multilayered interference film is shown in FIG. 2. In that figure multilayered interference films 5, are formed on a glass substrate 1. In FIG. 2, a TiO₂ film 4 is formed on the glass substrate 1, and a SiO₂ film 3 and a TiO₂ film 2 are stacked in sequence on the TiO₂ film 4. Three multilayered interference films such as this are arranged along side each other one for each of the colors red, green, and blue. Here, the refractive indexes of the titan oxide and the silicon oxide are 2.4 and 1.5, respectively. Also, the absorbed wavelength region and the transmitted wavelength region are determined by the mutual relationship between the thicknesses of the oxide layers, and color to be emitted. Generally, if film thickness=(target center wavelength λc)× (2n−1)/4 (n=integer number), emission of a target color will take place due to interference. Although not shown in FIG. 2, TFTs for changing the orientation of a liquid crystal are formed on the glass substrate in addition to the multilayered interference film 5.

In a multilayered interference film, reflectance R prescribing requisite brightness is proportional to the square of $(n_1-n_2)/(n_1+n_2)$, and $n_1$ and $n_2$ are the refractive indexes of the respective films which constitute a multilayered interference film. If the difference Δn between the refractive indexes of two films of a multilayered interference film is large, sufficient reflectance R will be obtainable to provide bright images. As the value of $n_1-n_2=\Delta n$ is made larger, brightness increases.

Figure 3:
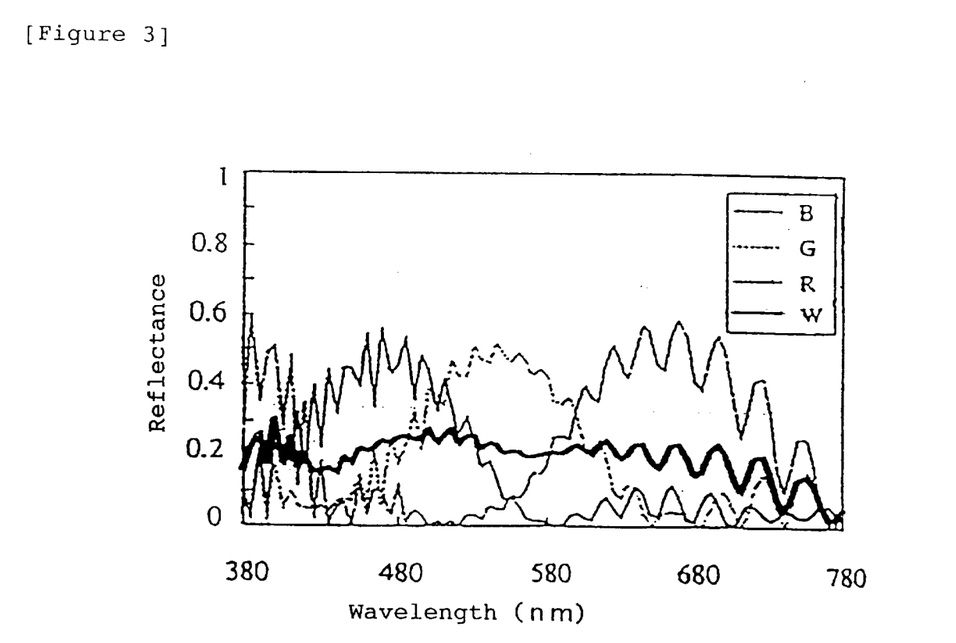
FIG. 3 is a diagram showing the wavelength-reflectance dependency of the type shown in FIG. 2.

However, color purity is degraded as the difference Δn between the refractive indexes of two films is enlarged. That is, in a multilayered interference film where the difference Δn between the refractive indexes of two films is large, the measured wavelength-reflectance dependency has an extremely broad peak of reflectance with respect to the center wavelength. Generally speaking, such a broad wavelength-reflectance characteristic is not sufficient from the point of color purity. Therefore, in the background art a Δn<1 has been employed. For example, the combination of a titan oxide (TiO₂) and a silicon oxide (SiO₂), shown in FIG. 2, has Δn=0.9. In such a combination, Δn becomes large and therefore the reflectance R is small, so a sufficient white level cannot be ensured. FIG. 3 shows the wavelength-reflectance dependency of the multilayered interference film shown in FIG. 2. In each of the red, green, and blue regions, the reflectance is about 60% at its maximum and sufficient reflectance is unobtainable. Therefore, the white level (heavy line) inevitably is too small to be of practical use. Thus, even in the color emission of the multilayered interference film type, as with the color emission of the color filter, the equilibrium between color purity and brightness (white level) is an essential problem. Also, in the multilayered interference film type there is the antinomy that a larger Δn makes both the reflectance of each of the multilayered interference films and the brightness (white level) larger, but, on the other hand, degrades color purity.

Figure 4:
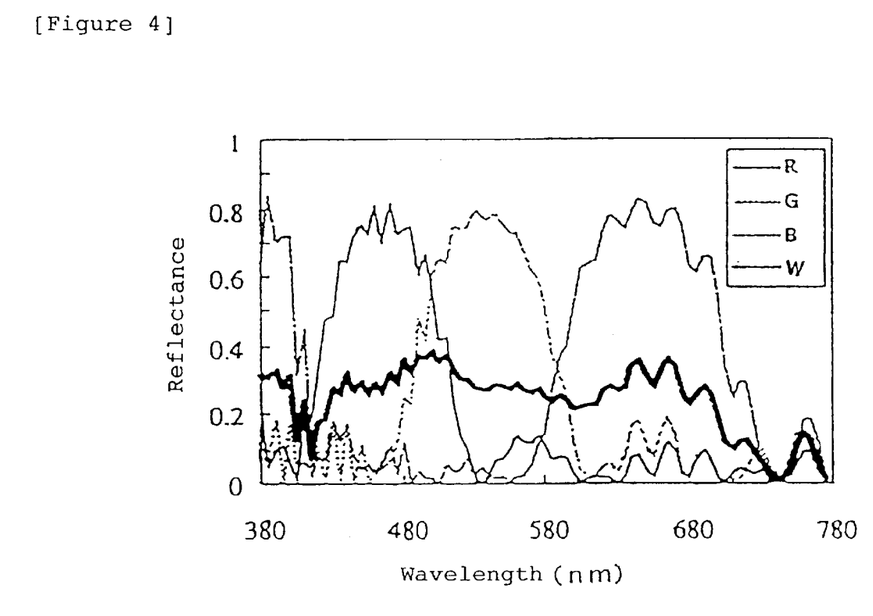
FIG. 4 is a diagram showing the wavelength-reflectance dependency of a parallel multilayered interference film type (five layers)

To increase the white level, a five level form of the aforementioned multilayered interference film has been considered. Since the white level depends on the total amount of light reflected by each layer, the absolute amount of light to be reflected is increased by increasing the number of layers. The wavelength-reflectance dependency of a multilayered interference film consisting of five layers is shown in FIG. 4. The five-layer film is formed by simply adding' a layer of $SiO_2$ and a layer of $TiO_2$ to the three-layer film shown in FIG. 2. The white level is slightly improved, compared to the three level film, but there is no essential improvement. Therefore, the limitation on brightness (white level) exits in the solution method of forming a multilayered interference of each color in parallel on the glass substrate 1 and increasing the number of layers of the respective multilayered interference films.

PROBLEMS TO BE SOLVED BY THE INVENTION

Therefore, an objective of the present invention is to provide a reflection liquid crystal display of the multilayered interference film type which has a sufficient white level without increasing the number of layers of a multilayered interference film.

Another objective of the present invention is to provide a reflection liquid crystal display of the multilayered interference film type which has a sufficient white level while maintaining high color purity.

Still another objective of the present invention is to provide a reflection liquid crystal display of the multilayered interference film type which has both sufficient color purity and a sufficient White level provided by a combination, having a large $\Delta n$.

SUMMARY OF THE INVENTION

According to the present invention, a reflection type liquid crystal display with high color purity is provided with a sufficient white level. This is achieved by stacking multiple reflection type liquid crystal displays each comprising at least a transparent substrate, a multilayered film formed on the transparent substrate, and a light transmission layer, such as a liquid crystal layer, formed on the multilayered film. Combinations of the transparent substrate, the multilayered film, and the light transmission layer, which relate to at least two colors, are stacked at the same position on the plane of the display. It is preferable that the multilayered film comprises three dielectric layers. Also, it is preferable that the multilayered film be constituted by at least two kinds of dielectric layers and that the difference between a first refractive index of a first dielectric layer and a second refractive index of a second dielectric layer, $\Delta n$, is $\Delta n>1.2$.

Furthermore, the reflection type liquid crystal display is characterized in that a first multilayered film of an upwardly positioned combination of the combinations, which relates to a first color, filters out light other than a wavelength region of a downwardly positioned combination which relates to a second color so that color purity required for emitting the second color is ensured. With this method, even if there were used a multilayered film which has $\Delta n$ that is large to the extent that sufficient color purity cannot be realized by a second multilayered film alone which relates to a second color, sufficient color purity could be realized. Therefore, sufficient color purity and sufficient white level are compatible.

BRIEF DESCRIPTION OF THE DRAWINGS

These and other aspects of the present invention can best be understood from the following description while referring to the accompanying figures of which.

DETAILED DESCRIPTION

Figure 5:
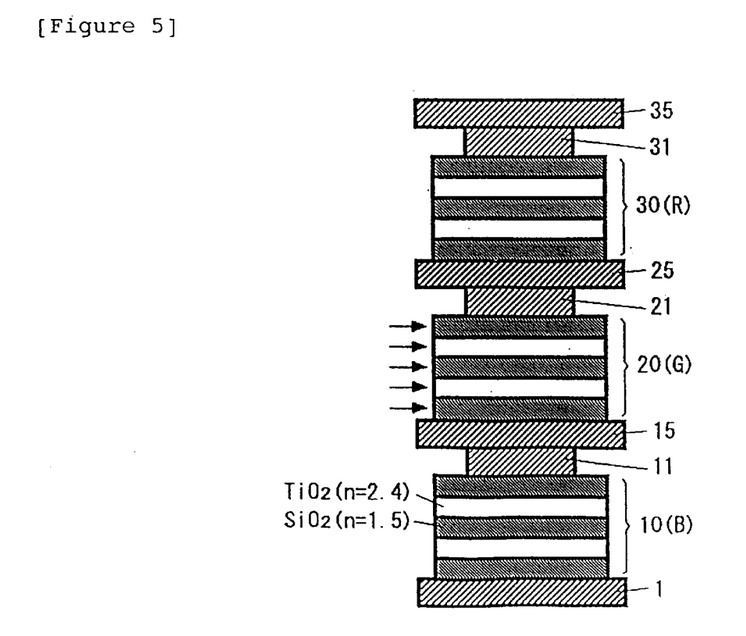
FIG. 5 is a sectional view showing a first embodiment of the present invention.

A first embodiment of the present invention is shown in FIG. 5. In this embodiment, a five-layer interference film is formed for each color, and this multilayered film is combined with a liquid crystal layer relating to each color. That is, a multilayered interference film 10 consisting of five layers for blue (B) is formed on a glass substrate 1, and on the film 10 a liquid crystal layer 11 and another glass substrate 15 are formed. These are formed as a single unit. On the glass substrate 15 a multilayered interference film 20 consisting of five layers for green (G) is formed, and on the film 20 a liquid crystal layer 21 and another glass substrate 25 are formed. On the glass substrate 25 a multilayered interference film 30 consisting of five layers for red (R) is formed, and on the film 30 a liquid crystal layer 31 and a glass substrate 35 are formed. Thus, the first embodiment has a structure where combinations of a multilayered interference film relating to each color and a liquid crystal layer are stacked in series. The advantage of the series structure is that a white level (the heavy line shown in FIG. 6) is considerably enhanced. The reason is that while the intensity of a white level in a parallel multilayered interference film method (see FIGS. 2 and 3) is reduced to ⅓ of the reflectance relating to each color in proportion to the area of each multilayered interference film, the intensity of a white level in a series multilayered interference film method is not reduced in proportion to the area. Therefore, the reflectance relating to each color, as it is, becomes a white level intensity, and consequently, it becomes possible to obtain a sufficiently bright image.

Figure 6:
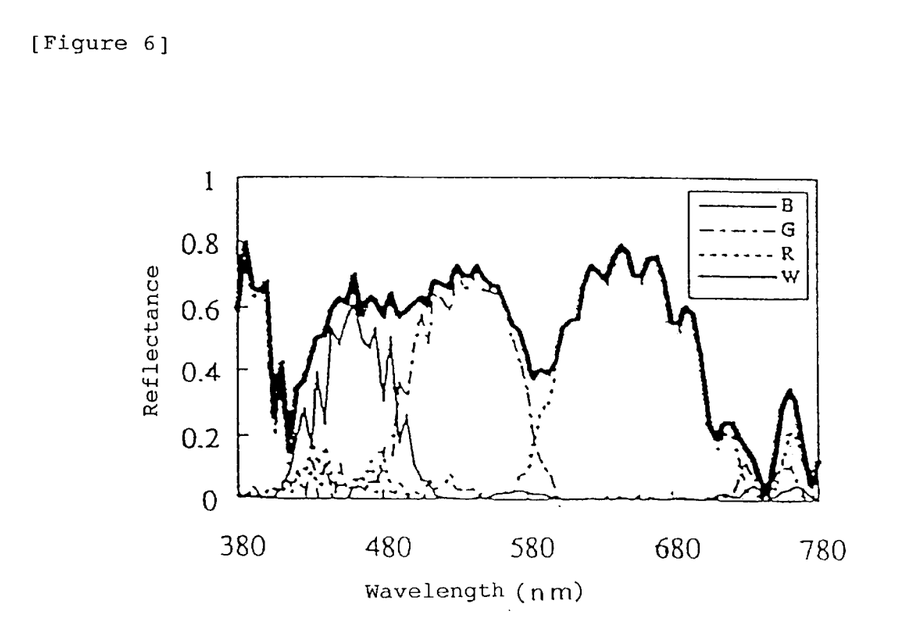
FIG. 6 is a diagram showing the wavelength-reflectance dependency of the first embodiment.

The wavelength-reflectance characteristic relating to each color in this case is also shown in FIG. 6. In this structure, in order to obtain a wavelength-reflectance where a half-value width is relatively narrow relative to the center wavelength of each color to ensure color purity, there is the need to make $\Delta n$ relatively small. The range of $\Delta n$ which is allowed in the first embodiment is $\Delta n<1.5$, preferably $\Delta n<1.0$. Therefore, a suitable combination of oxides in this embodiment is typically a combination of a titan oxide ($TiO_2$) and a silicon oxide ($SiO_2$) ($\Delta n=0.9$).

In the first embodiment, a combination of R, G, and B is arrayed in that order from the vertically stacked combinations of a multilayered interference film and a liquid crystal layer. However, it is also possible to array R, G, and B in another order.

Figure 7:
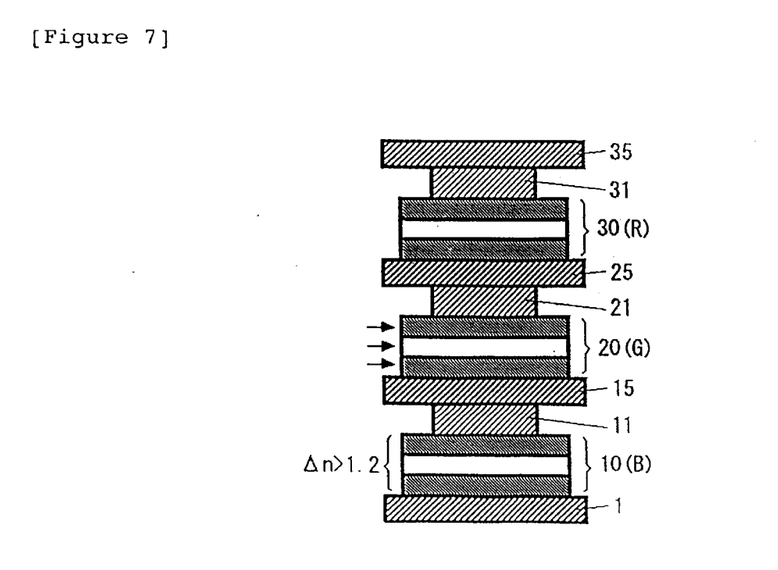
FIG. 7 is a sectional view showing a second embodiment of the present invention.

An improved second embodiment is shown in FIG. 7. In this structure, by making Δn greater than 1.2 (Δn>1.2) and making wavelength-reflectance dependency so as to have a structure which has a broad peak characteristic where a half-value width is wide, the color purity of the multilayered interference film of each color is sacrificed. As described later, in this embodiment, even if the color purity of the multilayered interference film of each color were sacrificed, sufficient color purity could be realized for the entire apparatus by making use of a series array of multilayered interference films and also utilizing an upwardly positioned multilayered interference film as a sort of optical filter.

The difference between the first embodiment and the second embodiment is that layers are reduced from five layers to three layers and that the Δn of the oxide layers of each multilayered interference film is large (in the range of Δn>1.2). That is, a multilayered interference film 10 consisting of three layers (for blue (B)) is formed on a glass substrate 1, and on the film 10 a liquid crystal layer 11 and another glass substrate 15 are formed. These are formed as a single unit. A multilayered interference film 20 consisting of three layers (for green (G)) is formed on the glass substrate 15, and a liquid crystal layer 21 and another glass substrate 25 are formed on the film 20. A multilayered interference film 30 consisting of three layers for red (R) is formed on the glass substrate 25, and a liquid crystal layer 31 and a glass substrate 35 are formed on the film 30. Thus, the second embodiment, as the first embodiment, has a structure where combinations of multilayered interference films relating to each color and a liquid crystal layer are stacked in series.

Figure 8:
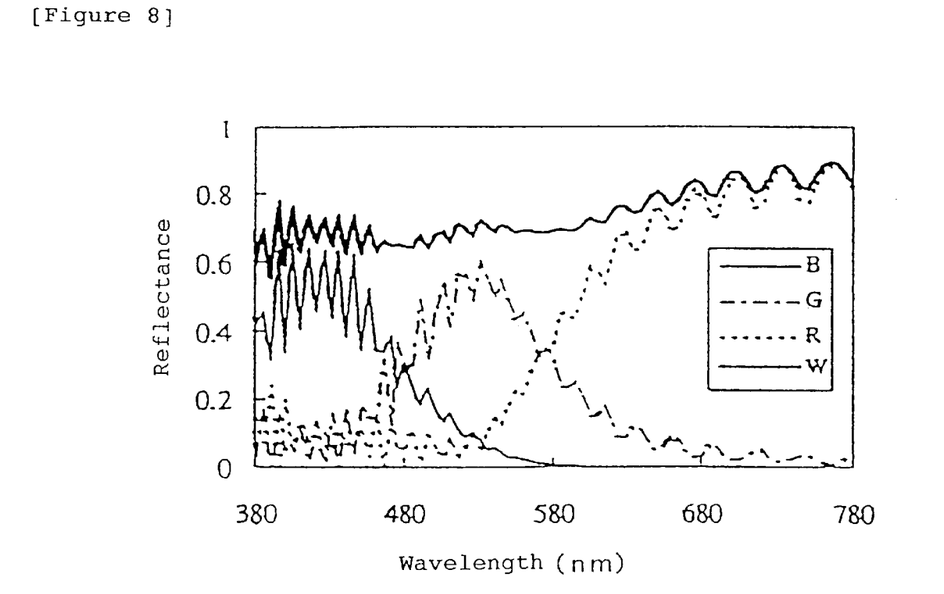
FIG. 8 is a diagram showing the wavelength-reflectance dependency of the second embodiment.

In the second embodiment, since Δn is large, the multilayered interference film of each color has sufficient reflectance. Therefore, it becomes possible to reduce the number of layers in comparison with the first embodiment. The second embodiment with a three-layer structure show in FIG. 7 can realize the same white level as the first embodiment or a white level higher than that of the first embodiment as shown in FIG. 8.

The principles of the second embodiment will hereinafter be described in further detail. First, the second embodiment has three liquid crystal layers 11, 21, and 31 corresponding to red, green, and blue and also has three multilayered interference films 10, 20, 30 corresponding to the three liquid crystal layers 11, 21, and 31. These are clamped by two glass substrates 1 and 35, and by two other glass substrates 15 and 25, three combinations of the liquid crystal layer (11, 21, 31) and the multilayered interference film (10, 20, 30) are separated from each other. It is preferable that the multilayered interference film (10 20, 30) comprise three layers, but it may comprise 5 or more layers. The Δn of the multilayered interference film is greater than 1.2, preferably 2.0. Therefore, as a combination of oxide films constituting the multilayered interference film, it is considered that cryolite, magnesium fluoride, sodium fluoride, cerium fluoride, and silicon monoxide are used as a low refractive-index film, and it is considered that silicon, germanium, and lead telluride are used as a high refractive-index film. The former refractive index and the latter refractive index are less than about 1.5 and greater than about 3.5, respectively, and at least Δn=2.0.

Figure 9:
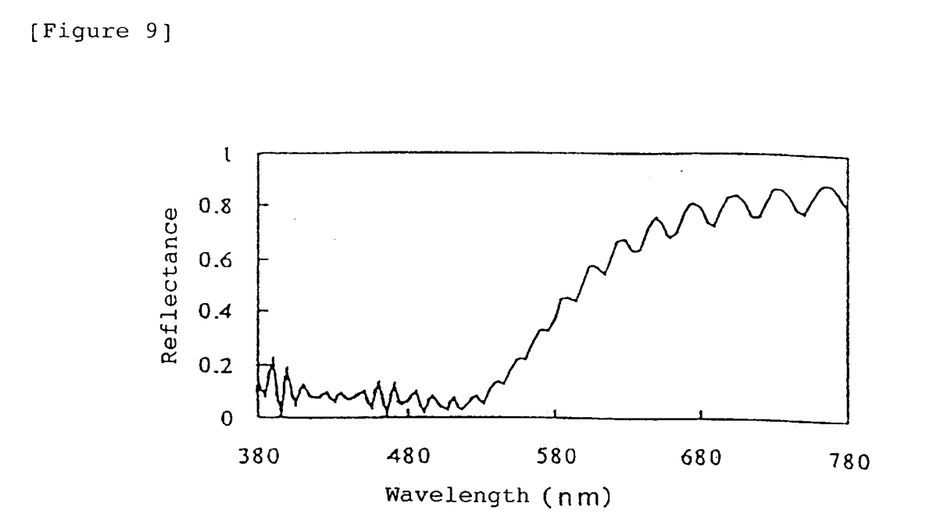
FIG. 9 is a diagram showing the wavelength-reflectance dependency of red of the second embodiment.
Figure 10:
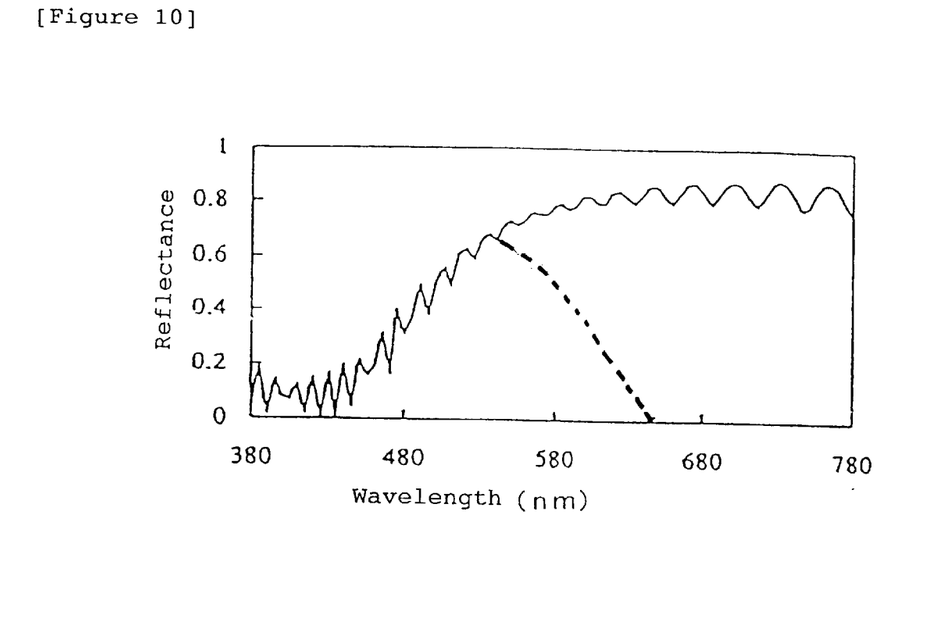
FIG. 10 is a diagram showing the wavelength-reflectance dependency of green of the second embodiment.
Figure 11:
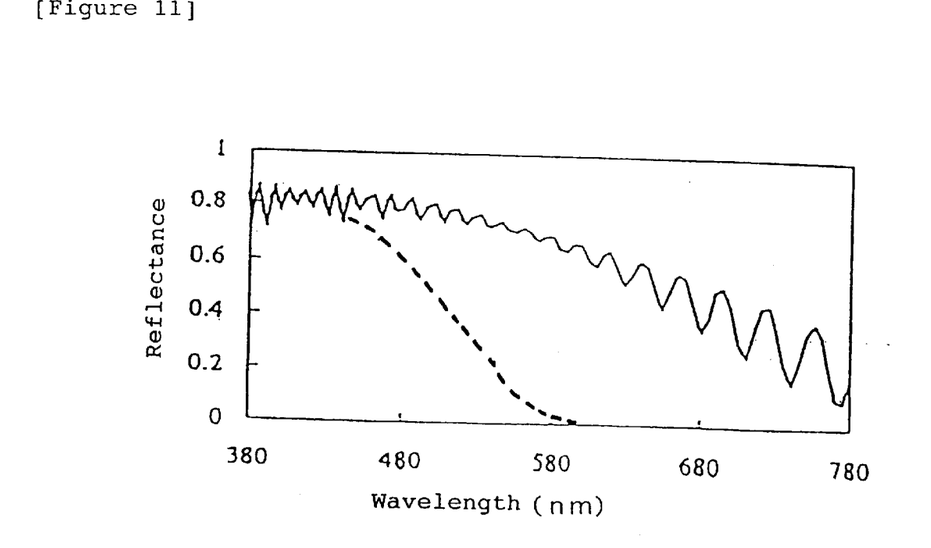
FIG. 11 is a diagram showing the wavelength-reflectance dependency of blue of the second embodiment.

Thus, making Δn larger is a feature of the second embodiment. Therefore, color purity relating to each color is sacrificed. FIGS. 9 through 11 show the wavelength-reflectance dependencies of red, green, and blue in the case where a combination of silicon and silicon oxide is used as a multilayered interference film. As shown in these figures, the wavelength-reflectance characteristic exhibits a broad characteristic. However, as described below, even in the case of such a broad characteristic, it will become possible to ensure sufficient color purity if there is utilized the feature of the second embodiment that combinations of a multilayered interference film and a liquid crystal layer are connected in series.

For example, consider both a combination of liquid crystal layer 31 and multilayered interference film 30 for red and a combination of liquid crystal layer 21 and multilayered interference film 20 for green. As shown in FIG. 9, for the wavelength-reflectance dependency of the multilayered interference film relating to red, the reflectance is 50% at a wavelength of 580 nm and more than 80% at a wavelength of more than 630 nm. Therefore, the most part of light with a wavelength of more than 580 nm is reflected by the multilayered interference film 30 relating to red and does not reach the liquid crystal layer 21 and multilayered interference film 20 relating to green. The reason is that a combination of liquid crystal layer 31 and multilayered interference film 30 relating to red is connected in series with a combination of liquid crystal layer 21 and multilayered interference film 20 relating to green and that the former is positioned just above the latter and filters out light of specific wavelength. In view of such a positional relationship, actually the wavelength-reflectance dependency of the multilayered interference film 20 of green in this array gives rise to the reduction of reflectance in the wavelength region of more than 580 nm and presents a characteristic such as that shown by a dotted line in FIG. 10. Therefore, in such a series positional relationship, the multilayered interference film 20 with broad wavelength-reflectance dependency can realize sufficient color purity by the filtering-out operation of the multilayered interference film 30 relating to red.

The same may also be said of a combination of liquid crystal layer 11 and multilayered interference film 10 relating to blue and a combination of liquid crystal layer 21 and multilayered interference film 20 relating to green. That is, the wavelength-reflectance dependency of the multilayered interference film 20 relating to green is shown in FIG. 10, and the reflectance is more than 50% at a wavelength of 490 nm and more than 80% at a wavelength of more than 580 nm. Therefore, light with a wavelength of more than 490 nm is reflected by the multilayered interference film 20 relating to green and does not reach the liquid crustal layer 11 and multilayered interference film 10 relating to blue. The reason is that a combination of liquid crystal layer 21 and multilayered interference film 20 relating to green is connected in series with a combination of liquid crystal layer 11 and multilayered interference film 10 relating to blue and that the former is positioned just above the latter and filters out light of specific wavelength. In view of such a positional relationship, the wavelength-reflectance dependency of the multilayered interference film 20 relating to blue gives rise to the reduction of reflectance in the wavelength region of more than 490 nm and presents a characteristic such as that shown by a dotted line in FIG. 11. Even in this case, the multilayered interference film relating to blue originally has broad wavelength-reflectance dependency, however, from the characteristic series positional relationship of the present invention it is found that sufficient color purity can be realized by the multilayered interference film relating to blue.

The white level, depicted by a combination of wavelength-reflectance dependencies relating to red, green, and blue, is shown in FIG. 8. As shown in the figure, it is found that while sufficient color purity is being maintained for each color, a sufficient white level can be realized.

Figure 12:
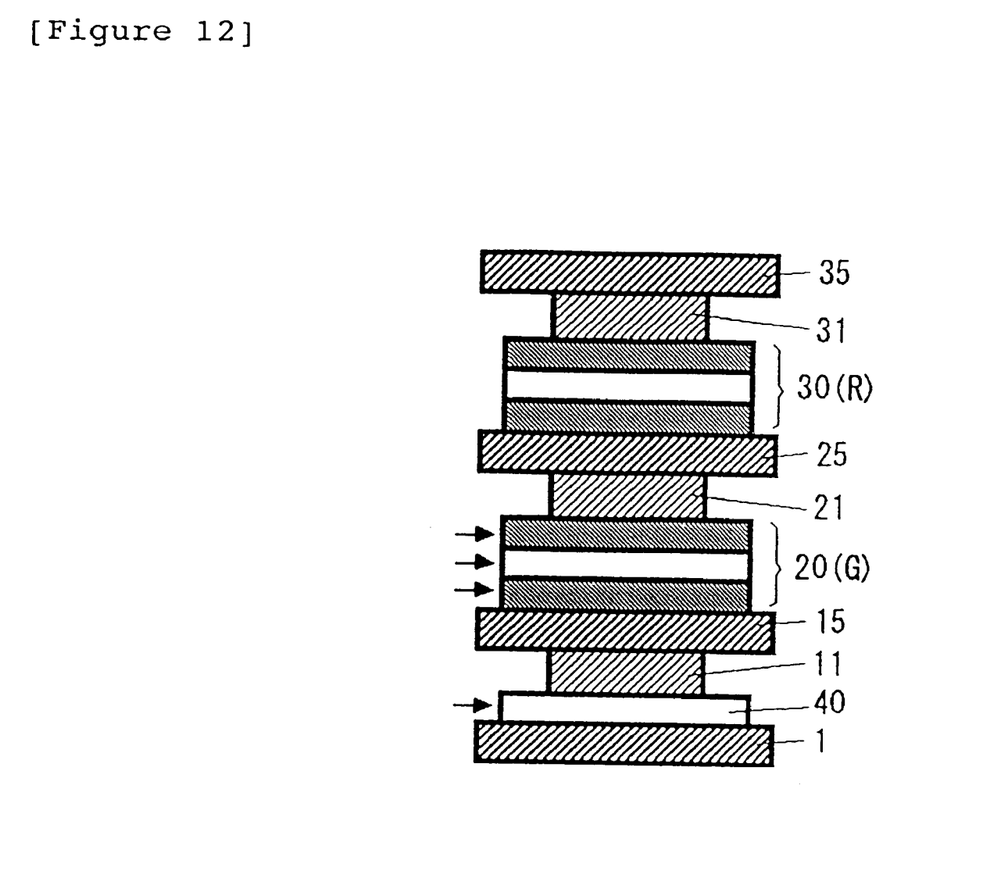
FIG. 12 is a sectional view showing a third embodiment of the present invention.

In FIG. 12 there is shown a third embodiment. This embodiment is very similar to the second embodiment, but a liquid crystal layer 11 relating to the color of the lowermost layer does not have a corresponding multilayered interference film. Instead, a metal plate 40 with high reflectance, such as aluminum, is employed, and this arrangement is distinguished from the second embodiment. Even in such a structure, since a liquid crystal layer and a multilayered interference layer relating to each color are connected in series, the wavelength region relating to red and the wavelength region relating to green are filtered out and light of the wavelength relating to blue does not reach the liquid crystal layer relating to the color of the lowermost layer. Therefore, it also becomes possible to ensure the color purity relating to blue. Also, since the metal plate 40 is higher in reflectance than multilayered interference films, the third embodiment can realize a white level higher than that of the second embodiment.

A method of fabricating the structure of the second embodiment of the present invention will be described in detail in reference to FIG. 7. First, two glass substrates 35 are prepared. Transparent electrode layers (not shown) are formed on the glass substrates 35, respectively. The most typical transparent electrode layer is a indium-tin oxide (ITO). Thereafter, multilayered films 10, 20, and 30 are formed on one of the two glass substrates. A suitable multilayered film is a combination of silicon and silicon oxide. The former refractive index and the latter refractive index are 3.5 and 1.5, respectively. The thickness of the multilayered film is varied based on whether the multilayered film is related to which color. For example, in the case of the multilayered film 30 relating to red, the thickness of the silicon film and the thickness of the silicon oxide film are 570 A or so and 1330 A or so, respectively. Similarly, the silicon film thickness and silicon oxide film thickness of the multilayered film 20 relating to green are 480 A and 1120 A, and the silicon film thickness and silicon oxide film thickness of the multilayered film 10 relating to blue are 290 A and 670 A. These multilayered films can be formed in a manner well known in the background art. For example, one suitable method is a sputtering method, and other methods are CVD and PVD. A combination of silicon and a silicon oxide film is assumed to be the most suitable combination. This is because silicon is cheap, and also a general purpose apparatus can be utilized because formation of a silicon film has generally been performed. In addition, silicon is congenial with silicon oxide, and there is no separation and no generation of a harmful compound at an interface. The silicon oxide layer is formed after formation of the silicon layer by various methods such as surface oxidation and oxygen ion implantation. The present invention is not limited to a specific film formation method and a specific multilayered-film fabrication method.

In the first embodiment of the present invention, a five-layer metal film is disposed as a multilayered interference film. However, if the thickness and type of the multilayered film used in the second embodiment are employed, the first embodiment can be sufficiently executed.

While it has been described in the aforementioned embodiments that oxides are employed as the layers which constitute the multilayered interference film, organic films and other dielectric films may be used as a layer. Also, although the embodiments have been described with reference to liquid crystal displays, a light transmission layer does not always need to be a liquid crystal layer. The layer will be sufficient if it is a light transmission layer which can control light transmittance by a constant stimulation caused by an external electric field.

I claim:

1. A reflection type liquid crystal display having combinations of a transparent substrate, a multilayered film formed on said transparent substrate, and a light transmission layer formed on said multilayered film, being characterized by two of said combinations, each for a different color, are stacked so that light passes through one of the combinations to reach the other, wherein said multilayered film is constituted by at least two kinds of dielectric layers and wherein the difference between a first refractive index of a first dielectric layer and a second refractive index of a second dielectric layer, $\Delta n$, is $\Delta n > 1.2$.

2. The reflection type liquid crystal display as set forth in claim 1, further comprising three such stacked combinations each combination related to a different color.

3. The reflection type liquid crystal display as set forth in claim 1, wherein each said multilayered film includes three dielectric layers.

4. A color emitting method for a reflection type liquid crystal display which uses combinations for different colors, each combination having a transparent substrate, a multilayered film formed on said transparent substrate, and a light transmission layer formed on said multilayered film, the improvement comprising stacking combinations relating to two different colors at the same position on a plane of said reflection type liquid crystal display so that a first multilayered film of an upwardly positioned one of said combinations, which relates to one of the colors, filters out light other than a wavelength region of a downwardly positioned combination which relates to the other of the colors whereby color purity required for emitting the second color is ensured, wherein said multilayered film of said second color includes at least two kinds of dielectric layers and the difference between a first refractive index of a first dielectric layer and a second refractive index of a second dielectric layer, $\Delta n > 1.2$ so that sufficient color purity cannot be obtained by using a second multilayered film alone of said combination which relates to said second color.

5. A reflection type liquid crystal display having combinations of a transparent substrate, at least one combination with a multilayered film formed on said transparent substrate, and a light transmission layer formed on said multilayered film, being characterized by at least two of said combinations, each for a different color, which are stacked so that light passes through one of the combinations to reach the other including a lowermost combination with a reflecting film comprising a single layer in place of said multilayered film used in said at least one combination.

6. The reflection type liquid crystal display as set forth in claim 5, wherein said reflecting film comprises a metal layer.

7. A color emitting method for a reflection type liquid crystal display which uses combinations for different colors, each combination having a transparent substrate, a multilayered film formed on said transparent substrate, and a light transmission layer formed on said multilayered film, the improvement comprising stacking combinations relating to two different colors at the same position on a plane of said reflection type liquid crystal display so that a first multilayered film of an upwardly positioned one of said combinations, which relates to one of the colors, filters out light other than a wavelength region of a downwardly positioned combination which relates to the other of the colors whereby color purity required for emitting the second color is ensured, wherein said multilayered film of said second color includes at least two kinds of dielectric layers and the difference between a first refractive index of a first dielectric layer and a second refractive index of a second dielectric layer, $\Delta n$, is large so that sufficient color purity cannot be obtained by using a second multilayered film alone of said combination which relates to said second color.

* * * * *